US008789135B1

(12) United States Patent
Pani (10) Patent No.: US 8,789,135 B1
(45) Date of Patent: Jul. 22, 2014

(54) SCALABLE STATEFUL FIREWALL DESIGN IN OPENFLOW BASED NETWORKS

(75) Inventor: Ayaskant Pani, Fremont, CA (US)

(73) Assignee: Google Inc., Mountain View, CA (US)

(*) Notice: Subject to any disclaimer, the term of this patent is extended or adjusted under 35 U.S.C. 154(b) by 84 days.

(21) Appl. No.: 13/524,979

(22) Filed: Jun. 15, 2012

(51) Int. Cl.
*G06F 17/00* (2006.01)
(52) U.S. Cl.
USPC ........ 726/1; 726/11; 726/12; 726/13; 726/23; 726/24; 726/25; 370/229; 370/235
(58) Field of Classification Search
USPC ............... 726/1, 11–13, 23–25; 370/229, 235
See application file for complete search history.

(56) References Cited

U.S. PATENT DOCUMENTS

| | | | |
|---|---|---|---|
| 4,979,118 A * | 12/1990 | Kheradpir | 701/117 |
| 7,607,170 B2 * | 10/2009 | Chesla | 726/22 |
| 7,937,761 B1 * | 5/2011 | Bennett | 726/23 |
| 8,363,549 B1 * | 1/2013 | Zhu et al. | 370/235 |
| 8,464,219 B1 * | 6/2013 | Wilkerson | 717/120 |
| 2005/0229246 A1 * | 10/2005 | Rajagopal et al. | 726/14 |
| 2008/0097113 A1 * | 4/2008 | Hayat et al. | 549/372 |
| 2008/0189769 A1 | 8/2008 | Casado et al. | |
| 2008/0235755 A1 * | 9/2008 | Blaisdell et al. | 726/1 |
| 2010/0138909 A1 * | 6/2010 | Chen | 726/11 |
| 2011/0162060 A1 * | 6/2011 | Vijayakumar et al. | 726/13 |
| 2012/0042374 A1 * | 2/2012 | Paddon et al. | 726/13 |
| 2013/0125230 A1 * | 5/2013 | Koponen et al. | 726/13 |

OTHER PUBLICATIONS

Naous et al., "Delegating Network Security with More Information", in WREN '09, Proceedings of the 1st ACM Workshop on Research on Enterprise Networking, Aug. 2009.
Ioannidis et al., "Implementing a Distributed Firewall," in CCS '00, Proceedings of the $7^{th}$ ACM conference on Computer and Commmunicaitons Security, Nov. 2000.

* cited by examiner

*Primary Examiner* — Kambiz Zand
*Assistant Examiner* — Tongoc Tran
(74) *Attorney, Agent, or Firm* — Foley & Lardner LLP; Edward A. Gordon (57) ABSTRACT

A logically centralized controller provides a stateful firewall service provider on a network. The logically centralized controller routes a plurality of packets associated with a traffic flow to a firewall, and blocks, allows, or further monitors the traffic flow based on the inspection of the plurality of packets by the firewall. The logically centralized controller thereby prevents unauthorized network activity while allowing network traffic to bypass the bottleneck created by the firewall.

38 Claims, 8 Drawing Sheets

SCALABLE STATEFUL FIREWALL DESIGN IN OPENFLOW BASED NETWORKS

TECHNICAL FIELD

The systems and methods described herein relate, among other things, to computer networks, and particularly, to providing scalable firewall service in a network.

BACKGROUND

Firewalls are deployed in networks to prevent unauthorized activity. Traditionally, most attempts at unauthorized activity on a network come from outside the network, so a firewall is typically deployed between an intranet and a connection to a wider network. As checking for unauthorized activity slows down network traffic, firewalls usually present a tradeoff between security and speed. Firewalls may be distinguished into three categories based in part on this tradeoff.

Firewalls in the first category filter data packets based on header fields of the packets. While these filter-based firewalls are simple to design and can rapidly determine whether or not a packet meets a filtering rule, they cannot detect more sophisticated attacks, such as when a traffic flow hides malicious activity within a seemingly benign traffic protocol.

Firewalls of the second category, referred to as proxy firewalls, serve as a proxy between a server and an end-host. Every message exchanged between the server and the end-host are parsed by the proxy firewall, which applies sophisticated rules which consider the state of the exchange between the server and end-host as well as the individual packet. Proxy firewalls therefore offer the highest level of security, but require a great deal of computing power, and often require too much processing time to be implemented in a large-scale computer network.

The final category, stateful firewalls, represents a compromise between the other two categories. Like a proxy firewall, a stateful firewall makes a close examination of the initialization of a traffic flow and blocks unauthorized traffic flows. But if the traffic flow passes the initial test, the stateful firewall creates a state corresponding to the traffic flow, and all further packets matching the characteristics of the traffic flow may pass rapidly through the firewall. Stateful firewalls therefore provide better protection from malicious activities than a filter-based firewall, but without creating the traffic slowdowns associated with proxy firewalls. Stateful firewalls nonetheless reduce network performance. If the network is to be defended against unauthorized activity, all network activity must pass through the stateful firewalls, limiting network bandwidth.

A system to provide a scalable stateful firewall to a network would therefore be of great benefit to computer networks, particularly a system that allows approved traffic flows to bypass a firewall.

SUMMARY

Accordingly, in one aspect, the system and methods described herein relate to providing a scalable stateful firewall to a network. A logically centralized controller identifies a first plurality and a second plurality of packets associated with a traffic flow. The logically centralized controller routes the first plurality of packets to a firewall, which determines whether the traffic flow violates a predetermined rule. If the firewall discovers a violation, the logically centralized controller may block the traffic flow within the network, preventing unauthorized activity. If the firewall finds no violation, the first plurality of packets are forwarded from the firewall to a destination of the traffic flow, while the second plurality of packets are routed directly to the destination, reducing the network traffic that must pass through the bottleneck of the firewall. Moreover, the logically centralized controller may route a larger or smaller number of packets associated with a traffic flow to the firewall based on how likely the traffic flow is to violate the predetermined rule, improving network security without tightening the bottleneck for all network traffic. The logically centralized controller thereby provides scalable prevention of unauthorized network activity.

In certain embodiments, the method provides stateful firewall service to a network having a software-configured switch. The method identifies a traffic flow of data from a source server or end-host to a destination server or end-host. The method provides a software-configured switch with a precautionary traffic routing plan in which the traffic flow is routed through a firewall implementing a predetermined rule. In certain embodiments, the firewall is capable of searching a header and a body of a packet for a violation of the predetermined rule. The predetermined rule may be implemented by determining whether a header of a packet matches an authorized transfer protocol, by determining whether a header of a packet matches an authorized Internet Protocol (IP) address, by searching the body of a packet for a regular expression associated with a banned transfer protocol, or by some other suitable implementation. In response to finding the traffic flow in compliance with the predetermined rule, the method marks the traffic flow as being in a flow state and identifies a plurality of packets associated with the traffic flow, which may include a predetermined fraction of packets associated with the traffic flow. In response to detecting a violation of the predetermined rule, the method marks the traffic flow associated with the violation as being in a breach state. The method provides the software-configured switch with an update to the precautionary traffic routing plan in which a traffic flow in the breach state is blocked, the plurality of packets identified as associated with a traffic flow in the flow state bypasses the firewall, and all other packets are routed through the firewall. In certain embodiments, compliance with the predetermined rule may be found based on a packet initializing the traffic flow. In certain embodiments, compliance with the predetermined rule may be found based on a packet generated in response to a packet initializing the traffic flow.

In certain embodiments, the method further provides a logically centralized controller which examines a packet header of a packet initializing the traffic flow to identify the traffic flow. The logically centralized controller may be an OpenFlow Controller. In certain further embodiments, the method may further comprise providing the firewall with an aggregate behavior of packets in the traffic flow identified by the logically centralized controller. The aggregate behavior may include whether a packet exchange rate exceeds a maximum threshold included in the predetermined rule, whether an average packet size exceeds a maximum threshold included in the predetermined rule, or some other aggregate behavior.

In certain further embodiments, the method may further comprise providing the software-configured switch with an update to the precautionary traffic routing plan removing a traffic flow in response to identifying an indicator of an end of the traffic flow. The indicator may include an end-of-session packet for the traffic flow, a predetermined period of inactivity, or some other suitable indicator of the end of a traffic flow.

In certain further embodiments, the method may further comprise identifying a change of network topology and providing the software-configured switch with an updated precautionary traffic routing plan based on the precautionary traffic routing plan and the change of network topology.

In certain further embodiments, the method may further comprise routing a first traffic flow through a first firewall implementing the predetermined rule and routing a second traffic flow through a second firewall implementing the predetermined rule.

According to another aspect, the system described herein relates to providing a stateful firewall service to a network having a software-configured switch. In certain embodiments, the system includes a switch manager, a firewall, and a solver. The switch manager programs the software-configured switch with a precautionary traffic routing plan generated by the solver. In certain embodiments, the switch manager is an OpenFlow controller. The precautionary traffic routing plan routes a plurality of packets associated with a traffic flow through the firewall, which determines whether the traffic flow is in a flow state or a breach state based on a predetermined rule. If the firewall detects a violation of the predetermined rule, the firewall places the traffic flow in a breach state. In the precautionary traffic routing plan generated by the solver, a traffic flow in the breach state is blocked, a first plurality of packets associated with a traffic flow in the flow state bypasses the firewall, and a second plurality of other packets is routed through the firewall. The second plurality of packets may include a packet initializing a traffic flow, a packet generated in response to a packet initializing a traffic flow, a predetermined fraction of packets associated with the traffic flow, or some other suitable plurality of packets. The predetermined rule may include an authorized transfer protocol, an authorized IP address, or some other suitable rule. In certain embodiments, the firewall may be further configured to search a header and a body of a packet to assign a state to an associated traffic flow based on the predetermined rule. In such embodiments, the predetermined rule may include banning a regular expression associated with a transfer protocol.

In certain further embodiments, the switch manager is further configured for providing a measure of an aggregate behavior of the packets in the traffic flow to the firewall. In such embodiments, the predetermined rule may include a range of a packet exchange rate associated with the traffic flow, a range of a size of a plurality of packets associated with the traffic flow, or some other suitable rule regarding an aggregate behavior of the packets in the traffic flow.

In certain further embodiments, the solver is further configured for removing a traffic flow that has ended from the precautionary traffic routing plan. In such embodiments, the switch manager may be further configured for identifying an indicator of an end of the traffic flow. The indicator may include an end-of-session packet for the traffic flow, a predetermined period of inactivity, or some other suitable indicator of the end of a traffic flow.

In certain further embodiments, the system may further comprise a second firewall for placing a traffic flow in a flow state or a breach state based on a predetermined rule. In such embodiments, the switch manager may be further configured to assign a first traffic flow to the firewall and a second traffic flow to the second firewall.

In certain further embodiments, the switch manager may be further configured to identify a change of network topology. In such embodiments, the solver may be further configured for updating the precautionary traffic routing plan based on the change of network topology.

BRIEF DESCRIPTION OF THE DRAWINGS

The systems and methods described herein are set forth in the appended claims. However, for the purpose of explanation, several embodiments are set forth in the following figures.

DETAILED DESCRIPTION OF CERTAIN ILLUSTRATIVE EMBODIMENTS

In the following description, numerous details are set forth for the purpose of explanation. However, one of ordinary skill in the art will realize that the embodiments described herein may be practiced without the use of these specific details and that the embodiments described herein may be modified, supplemented, or otherwise altered without departing from the scope hereof.

The system and methods described herein relate, in certain embodiments, to providing a stateful firewall using a logically centralized controller. In certain particular embodiments, the logically centralized controller routes a packet initializing a traffic flow to a firewall, and blocks, allows, or further monitors the traffic flow according to the inspection of the packet by the firewall.

Figure 1:
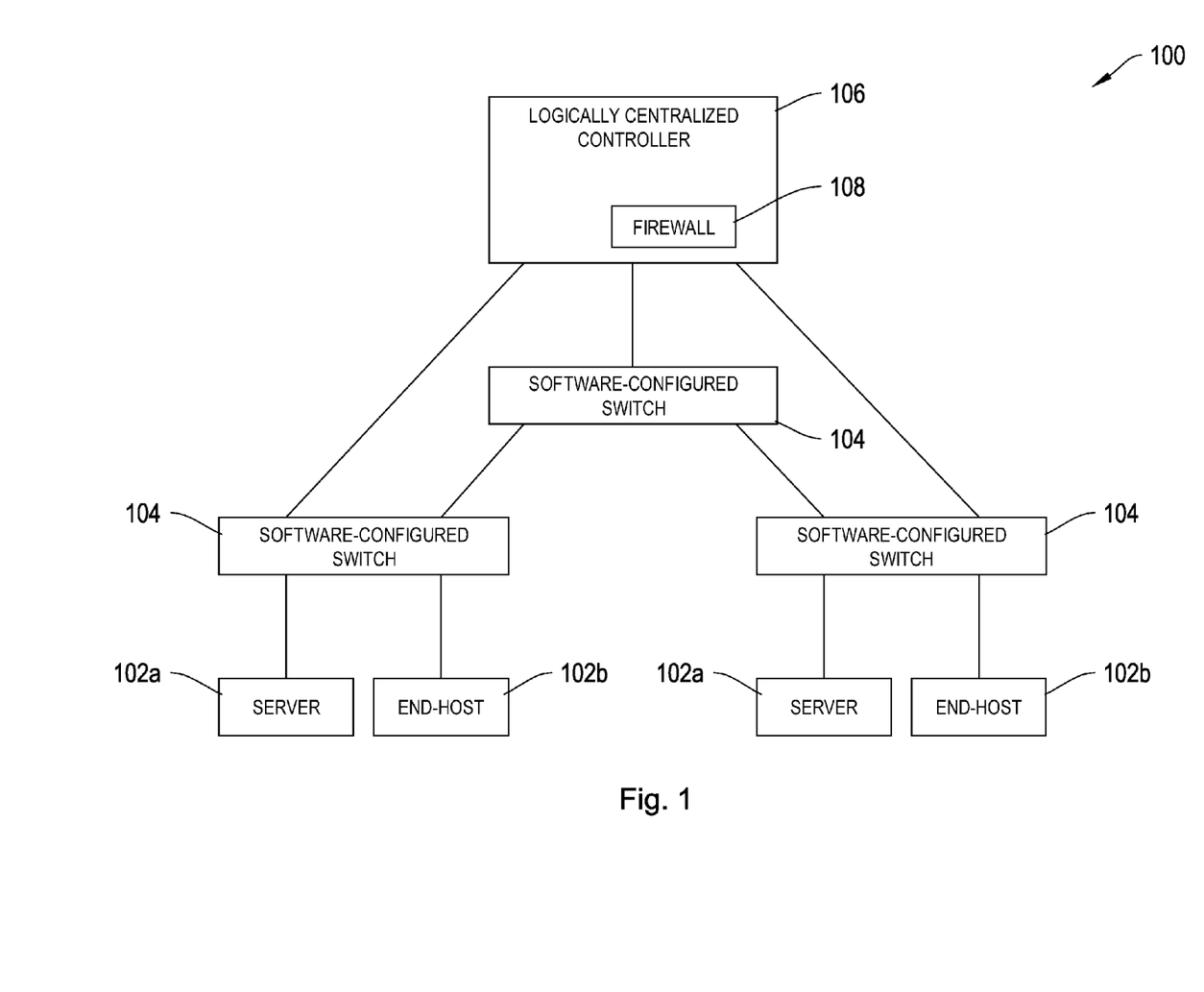
FIG. 1 is a block diagram of a network with a stateful firewall.

FIG. 1 is an illustrative block diagram of a network 100 with a stateful firewall. Network 100 allows servers 102a and end-hosts 102b, collectively referred to as servers 102, to exchange formatted units of data known as packets through an Ethernet connection, a WiFi connection, or other suitable network connection. A server 102a may be a software routine or a computer which provides data to other servers 102 on network 100 in response to a request, while an end-host 102b is a computer on network 100 which is connected to the Internet. Software-configured switches 104 are computer circuits which route data packets between servers 102 according to rules configured in the software of the switch. A server 102 may be connected to many other servers 102 through a single link to a software-configured switch 104. Software-configured switches 104 are described in detail in relation to FIG. 4. Logically centralized controller 106, a computer or cluster of computers described in detail in relation to FIG. 2, prevents unauthorized activity on network 100 by providing rules implementing a precautionary traffic routing plan to software-configured switches 104. The precautionary traffic routing plan routes a packet associated with a traffic flow through firewall 108, depicted as a component of logically centralized controller 106. In certain embodiments, firewall 108 may be a component of network 100 distinct from logically centralized controller 106. Firewall 108 may be a computer or a software routine which examines traffic flows to detect a violation of a predetermined rule. As an illustrative example, firewall 108 may determine whether a traffic flow is associated with an application banned on network 100. Logically centralized controller 106 configures software-configured switches 104 to block traffic flows associated with detected violations. If firewall 108 does not detect a violation in a traffic flow, logically centralized controller 106 may program software-configured switches 104 with a traffic routing plan in which packets associated with the traffic flow bypass logically centralized controller 106. Such a traffic routing plan directs software-configured switches 104 to forward packets associated with the traffic flow directly to a destination server 102. Thus, logically centralized controller 106 may implement the predetermined rule of firewall 108 in network 100 without requiring all network traffic to pass through a restrictive bottleneck. Network 100 may include a different number of software-configured packet switches 102, servers 104, or firewalls 108 than are shown.

The centralized overview and control provided by the depicted logically centralized controller 106 may secure network 100 against unauthorized activity. Logically centralized controller 106 provides the software-configured switches 104 with a precautionary traffic routing plan, in which a traffic flow is routed through firewall 108 by default. Firewall 108 determines whether the traffic flow violates a predetermined rule. If so, logically centralized controller 106 blocks the associated traffic flow, and may also alert a network administrator, block further network traffic from the source of the violation, or make other suitable responses. If firewall 108 does not detect a violation, logically centralized controller 106 forwards the packet to the destination server 102, and may update the precautionary traffic routing plan to allow a plurality of packets associated with the traffic flow to bypass logically centralized controller 106 on the way to destination server 102. Logically centralized controller 106 may also provide firewall 108 with further information regarding a traffic flow, such as other packets associated with the traffic flow, an average length of a packet associated with the traffic flow, an average rate of packet exchange associated with the traffic flow, or other suitable information.

Figure 2:
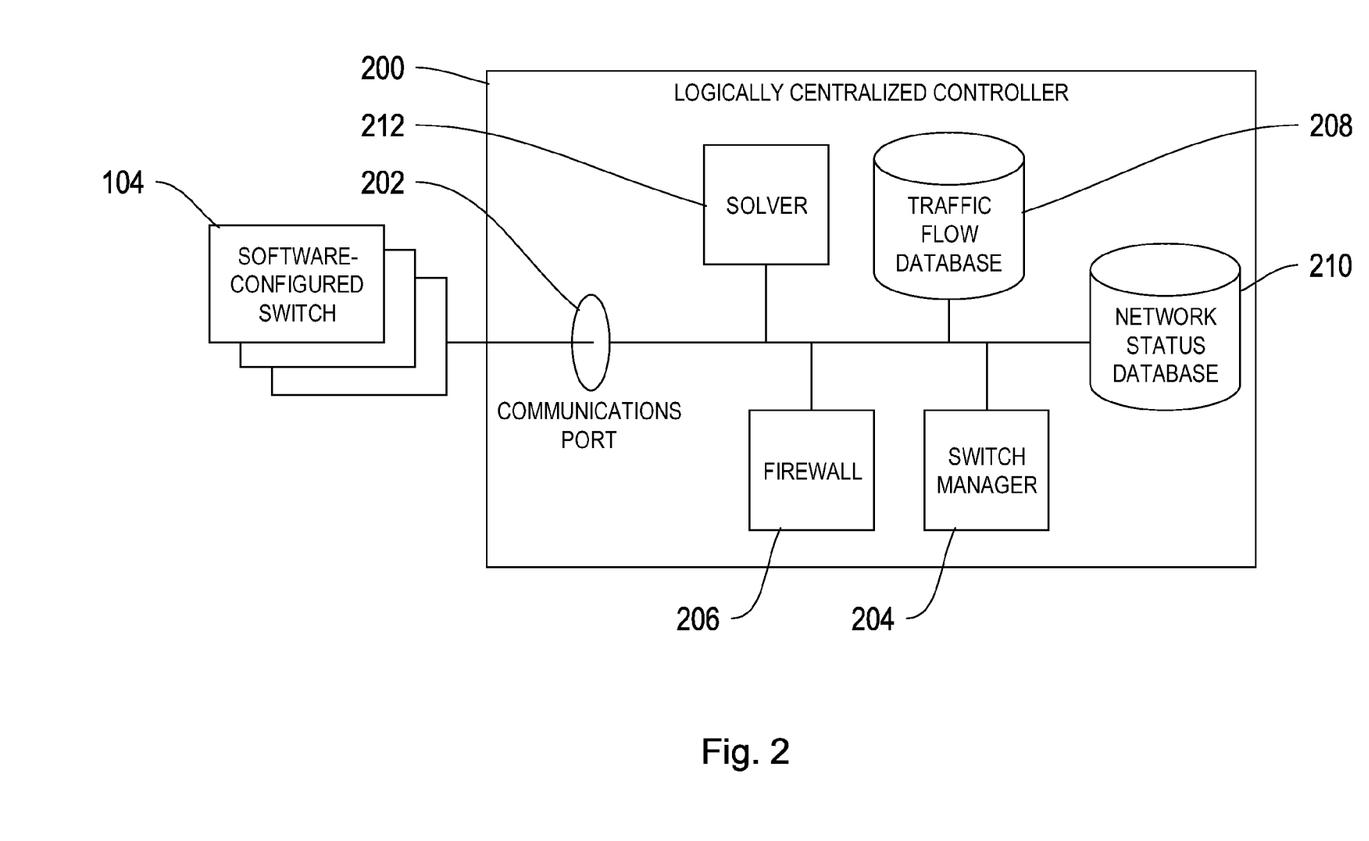
FIG. 2 is a block diagram of a logically centralized controller coordinating a stateful firewall.

FIG. 2 is an illustrative block diagram of a logically centralized controller 200 such as the logically centralized controller 106 depicted in FIG. 1. The elements of logically centralized controller 200 may be located on a single server, located on separate servers connected by a network, or otherwise logically centralized. Referring to FIG. 1, logically centralized controller 200 communicates with other elements of network 100 through communication port 202. Switch manager 204 may both provide a traffic routing plan to and receive data from a software-configured switch 104 through a control communications channel established through communication port 202. Upon receiving a packet associated with a traffic flow, switch manager 204 identifies the traffic flow based on the packet source, destination, protocol, or other identifying information, and provides the packet to firewall 206. Based on data provided by switch manager 204, firewall 206 determines whether the traffic flow violates a predetermined rule and places the traffic flow in a breach state or a flow state accordingly. Traffic flow database 208 records information regarding a traffic flow, which may include a source, destination, protocol, average packet exchange rate, average packet size, state of the traffic flow, or other information regarding the traffic flow. Similarly, network status database 210 stores network traffic data and network element status data identified by switch manager 204, such as the amount of traffic between two servers 102, the capability of a software-configured switch 104 to store or carry out a traffic routing rule, how a software-configured switch 104 is connected to other elements of a network, or other network traffic data and network element status data. Solver 212 creates a precautionary traffic routing plan based on the information stored in traffic flow database 208 and network state database 210, in which a traffic flow in the breach state is blocked, a plurality of packets associated with a traffic flow in the flow state bypasses logically centralized controller 200, and other packets are routed to firewall 206 to determine if a traffic flow violates a predetermined rule. Logically centralized controller 200 thus provides a stateful firewall service to a network by requiring traffic flows to be examined by firewall 206 without requiring every packet to pass through the bottleneck of firewall 206. In certain embodiments, logically centralized controller 200 may be an OpenFlow Controller.

The depicted communication port 202 is a network port which receives status information and traffic related to a network service from network 100 and transmits network traffic and instructions sent by logically centralized controller 200. Communication port 202 may include 100BASE-TX ports, 1000BASE-T ports, 10 GBASE-T ports, or other suitable network ports. In certain embodiments, there may be a different number of ports than are depicted. In certain embodiments, communication port 202 may provide secure communications, such as by using the Secure Sockets Layer (SSL) protocol, the Transport Layer Security (TLS) protocol, or other suitable protocol.

The depicted switch manager 204 is a computer processor for monitoring a software-configured switch 104 and for generating and implementing a traffic routing plan in software-configured switch 104. In certain embodiments, switch manager 204 may use the OpenFlow protocol or some other appropriate protocol for programming software-configured switch 104. Monitoring a software-configured switch 104 may include determining the amount of network traffic being received and forwarded by the software-configured switch 104, identifying the end of a traffic flow, measuring an aggregate behavior of packets in the traffic flow, identifying a change of network topology, or otherwise monitoring the status of the software-configured switch 104. Identifying the end of a traffic flow may include identifying when a software-configured switch 104 receives an end-of-session packet for the traffic flow, identifying a predetermined period of inactivity by the traffic flow, or identifying some other suitable indicator of the end of a traffic flow. Measuring aggregate behavior of packets in the traffic flow may include determining a packet exchange rate, determining a packet size of a plurality of packets associated with the traffic flow, or determining some other characteristic of the aggregate behavior of packets in the traffic flow. Switch manager 204 configures software-configured switch 104 with a precautionary traffic routing plan generated by solver 212, which may include routing a packet initializing a traffic flow through firewall 206 rather than broadcasting the packet. In certain embodiments, switch manager 204 may further provide a measure of an aggregate behavior of the packets in the traffic flow to firewall 206. If a packet or other information violates a predetermined rule implemented by firewall 206, switch manager 204 may configure a software-configured switch 104 to block the associated traffic flow. In certain embodiments, switch manager 204 may identify a change of network topology, such as the connection between a software-configured switch 104 and another element of network 100, and update network status database 210 accordingly. In certain embodiments, switch manager 204 may configure a software-configured switch 104 to perform firewall provision measures, such as identifying and blocking a packet associated with a banned transfer protocol, identifying and blocking a packet associated with a banned source Internet Protocol (IP) address, or other suitable measures.

The depicted firewall 206 is a computer processor for placing a traffic flow in a flow state or a breach state based on a predetermined rule. The predetermined rule may identify an authorized transfer protocol, an authorized source or destination IP address, or otherwise distinguish between authorized and unauthorized network traffic. A traffic flow found to violate the predetermined rule may be placed in a breach state, in which the traffic flow is blocked. If firewall 206 does not find a violation in a traffic flow, firewall 206 may place the traffic flow in a flow state, in which a plurality of packets associated with the traffic flow may bypass logically centralized controller 200 in being routed to a destination server 102. Firewall 206 may search for a violation of the predetermined rule within one or more headers of a packet associated with a traffic flow, which may include the packet source IP address, the packet destination IP address, the packet source port, the packet destination port, the packet transfer protocol, or other suitable packet headers. In certain embodiments, firewall 206 may also search the body of a packet for a violation of a predetermined rule, which may include a regular expression associated with a banned transfer protocol, a banned uniform resource locator (URL), or other suitable violation. As an illustrative example of such embodiments, firewall 206 may place a traffic flow in a breach state upon identifying a regular expression characteristic of a banned transfer protocol within the body of a packet with an authorized protocol header. In certain embodiments, firewall 206 may determine that a traffic flow associated with a packet should be dropped, allowed without restriction, or allowed under further monitoring. Firewall 206 records the state of the traffic flow in traffic flow database 208, and forwards packets that did not violate a predetermined rule to a destination server 102. If the traffic flow is placed in a flow state, firewall 206 may search another packet associated with the traffic flow for a violation and update the associated state in traffic flow database 208 accordingly. As an illustrative example, firewall 206 may monitor every packet of a Hypertext Transfer Protocol (HTTP) traffic flow until firewall 206 finds a packet associated with the traffic flow and requesting a permissible URL. In certain embodiments, firewall 206 will search more information regarding a first traffic flow in a flow state than information regarding a second traffic flow in a flow state. In certain embodiments, firewall 206 may further determine how network 100 should treat a traffic flow by inspecting the aggregate behavior of the packets in the traffic flow, which may include comparing a packet exchange rate, size of a plurality of packets, or other indicator of aggregate traffic flow behavior to a range of values. The range of values may be functions of the protocol of the traffic flow, the previous behavior of the traffic flow, or other suitable variables.

In certain embodiments, there may be more than one firewall 206. In such embodiments, switch manager 204 may provide packets or information associated with a first traffic flow to a first firewall 206, and to provide packets or information associated with a second traffic flow to a second firewall 206. Switch manager 204 may do so through a dynamic hashing technique, as described in detail in relation to FIG. 7.

The depicted traffic flow database 208 is a computer-readable and -writable medium storing information for a plurality of traffic flows in a network, and may include RAM, a hard drive, flash memory, or other suitable computer-readable and -writable medium. Information regarding a traffic flow may include an IP address and port of a source server 102 and a destination server 102, a transfer protocol, a packet exchange rate, a packet size, a rule for determining whether the traffic flow has ended, the state of the traffic flow, instructions for transmitting a plurality of packets associated with the traffic flow to a firewall 206, or other information suitable for identifying and monitoring a traffic flow. The information stored in traffic flow database 208 allows switch manager 204 to transmit information regarding a traffic flow to a firewall 206 associated with the traffic flow, and allows solver 212 to produce a traffic routing plan implementing the determinations of firewall 206. In certain embodiments, traffic flow database 208 may record information identifying a bidirectional traffic flow, in which two traffic flows use the same transfer protocol to transfer data between the same ports on the same servers 102, but which have opposite source and destination servers 102.

The depicted network status database 210 is a computer-readable and -writable medium storing information for a plurality of network elements, and may include RAM, a hard drive, flash memory, or other suitable computer-readable and -writable medium. The information stored in network status database 210 may identify how one element of network 100 is connected to another, the amount of network traffic between two servers 102, the capacity of a software-configured switch 104 or firewall 206 to store and apply a rule to a traffic flow, or other information regarding how much demand there is on the resources of network 100 and how much demand the resources of network 100 can meet. The information stored in traffic flow database 208 allows switch manager 204 to transmit information regarding a traffic flow to a suitable firewall 206, and allows solver 212 to produce a traffic routing plan meeting network traffic demand while implementing the determinations of a firewall 206.

The depicted solver 212 is a computer processor for generating a precautionary traffic routing plan that will allow firewall 206 to prevent unauthorized activity in network 100 without requiring that every packet on network 100 pass through firewall 206. The precautionary traffic routing plan includes a default rule routing packets through logically centralized controller 200. Switch manager 204 determines traffic flow identification information of the packet, which may include a source, a destination, a protocol, or other identifying information, and firewall 206 searches the packet for a violation of a predetermined rule. Thus, the precautionary traffic routing plan implemented by solver 212 causes a traffic flow to be examined by firewall 206 upon the initialization of the traffic flow. Solver 212 may update the precautionary traffic routing plan based on the traffic flow state determined by firewall 206. If firewall 206 places the traffic flow in a breach state, the routing rule may instruct a software-configured switch 104 to block packets associated with the traffic flow. If firewall 206 places the traffic flow in a flow state, the routing rule may override the default rule and allow a plurality of packets associated with the traffic flow to bypass logically centralized controller 200. Solver 212 provides the precautionary traffic routing plan to switch manager 204 to be implemented in software-configured switch 104. Solver 212 thereby provides stateful firewall service to a network by implementing the rules of firewall 206 throughout the connected network. The precautionary traffic routing plan may also route a second plurality of packets associated with the traffic flow, which may include a predetermined fraction of packets associated with the traffic flow, through firewall 206, allowing firewall 206 to further inspect the traffic flow beyond an initial approval phase. In response to switch manager 204 identifying the end of a traffic flow, solver 212 may remove the traffic flow from the precautionary traffic routing plan. In certain embodiments, solver 212 may further reduce the bottleneck created by firewall 206 by implementing a predetermined rule in the precautionary traffic routing plan. Such a routing rule may include blocking a packet with a source header matching a banned Internet Protocol (IP) address, blocking a packet with a regular expression in the body of the packet matching a banned protocol, or another similar routing rule, and may be provided to a software-configured packet switch 104 based on information stored in network status database 210. In certain embodiments, solver 212 may also update the precautionary traffic routing plan based on a change to the network topology detected by switch manager 204 or to an expected change in the network topology.

Logically centralized controller 200 prevents unauthorized activity on network 100 by checking traffic flows with firewall 206, but reduces firewall-related congestion by routing packets associated with compliant traffic flows directly to a destination server 102. When a server 102 attempts to initiate a traffic flow, switch manager 204 routes the packet initializing the traffic flow to firewall 206 to be inspected. If the initialization packet does not violate a predetermined rule implemented by firewall 206, firewall 206 forwards the initialization packet to a destination server 102. Switch manager 204 may route a packet confirming the initialization from destination server 102 to firewall 206 to be inspected as well. Firewall 206 records the result of the inspections in traffic flow database 208 as a state. According to the state, solver 212 may update a precautionary traffic routing plan to route a first plurality of packets associated with the traffic flow to bypass logically centralized controller 200 while routing a second plurality of packets through firewall 206 so the second plurality may be searched for a violation of the predetermined rule. If firewall 206 identifies a violation of the predetermined rule, the associated traffic flow will be blocked. Logically centralized controller 200 thereby provides stateful firewall service to a network 100, and may provide increased scrutiny of suspicious traffic flows without slowing down network 100 to examine trustworthy traffic flows.

Figure 3:
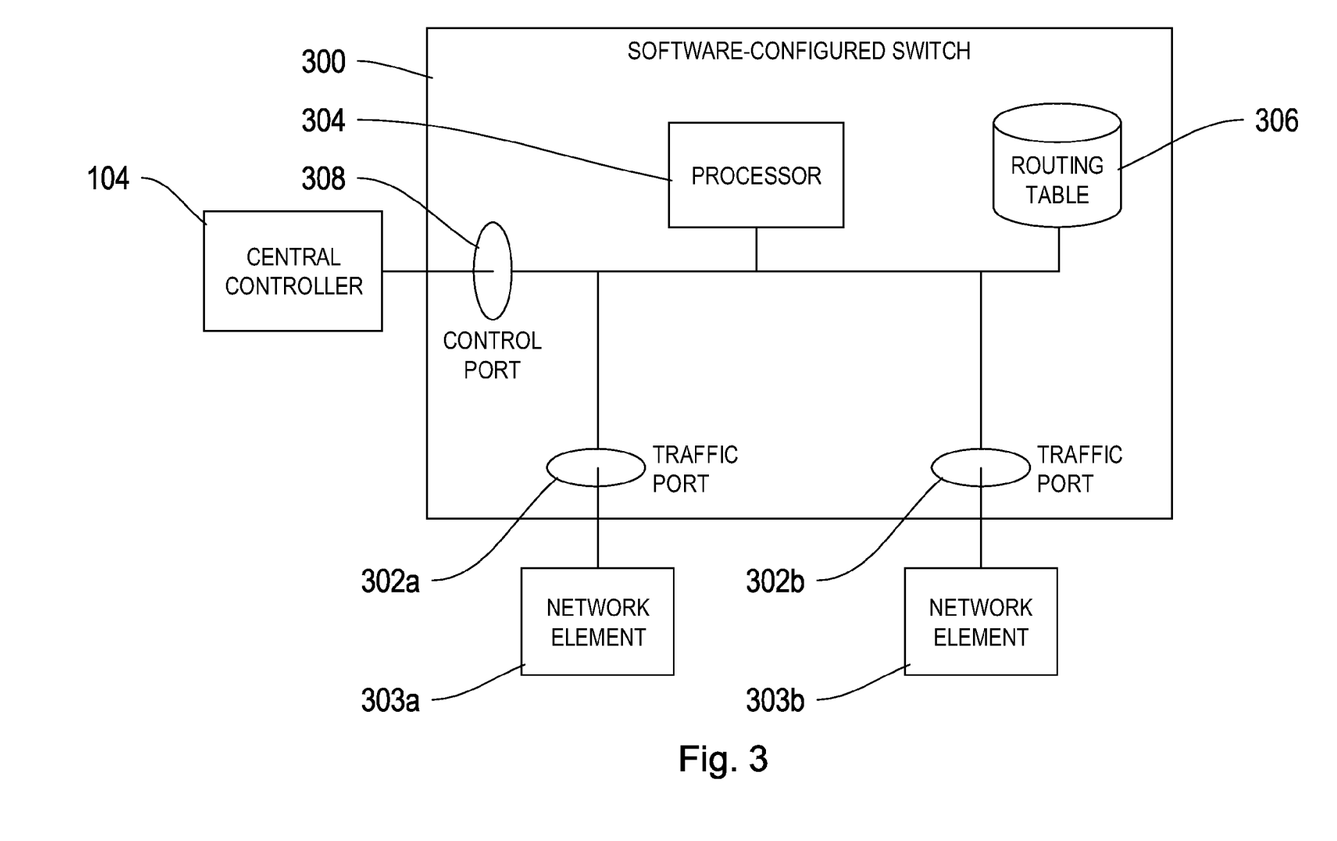
FIG. 3 is a block diagram of a software-configured switch used to route network traffic within a network and to a firewall.

FIG. 3 is an illustrative diagram of a software-configured switch 300 such as the software-configured switch 104 depicted in FIG. 1. Referring to FIG. 1, software-configured switch 300 may send and receive network traffic relating to a server 102 through traffic ports 302a and 302b, which are connected to network elements 303a and 303b (collectively network elements 303) respectively. A network element 303 may be a server 102, a firewall 108, a software-configured switch 300, or some other component of a computer network which may send or receive network traffic. Processor 304 determines the destination of incoming network traffic and forwards the traffic according to the rules stored in routing table 306. Referring to FIG. 1, the rules stored in routing table 306 are provided by logically centralized controller 106 via control port 308. Control port 308 also allows software-configured switch 300 to transmit request and response packets to or receive a response packet via logically centralized controller 106. In certain embodiments, software-configured switch 300 may operate under the OpenFlow protocol.

The depicted traffic ports 302a and 302b (collectively, traffic ports 302) are network ports which transmit network traffic to and receive network traffic from linked network elements 303a and 303b respectively. Traffic ports 302 may include 100BASE-TX ports, 1000BASE-T ports, 10 GBASE-T ports, or other suitable network ports. In certain embodiments, there may be a different number of ports than are depicted.

The depicted processor 304 is a computer processor capable of receiving, analyzing, and transmitting data through network ports. Processor 304 receives network traffic through traffic ports 302a and 302b and may receive a packet related to a service through control port 308. Processor 304 identifies where and how to transmit the network traffic and the service packet according to routing rules stored in routing table 306, and transmits the network traffic accordingly. In certain embodiments, processor 304 may program a hardware module, such as an application-specific integrated circuit (ASIC) or network processor, to perform the job of forwarding packets. Processor 304 can revise routing table 306 in response to receiving modification instructions from logically centralized controller 106 through control port 308. As an illustrative example of revising routing table 306, upon identifying a traffic flow violating a rule implemented by firewall 108, logically centralized controller 106 may provide a rule for dropping a packet with packet headers corresponding to the traffic flow. In certain embodiments, processor 304 may further identify characteristics of aggregate behavior of packets in a traffic flow passing through software-configured switch 300, such as a packet exchange rate, a packet size of a plurality of packets in the traffic flow, or other suitable characteristic of the aggregate behavior of the packets in the traffic flow.

The depicted routing table 306 is a computer-readable and -writable medium suitable for storing routing rules in software-configured switch 300, including RAM, a hard drive, flash memory, or other suitable computer-readable and -writable medium. A routing rule indicates where and how to transmit incoming network traffic based on the destination of the traffic, the source of the traffic, or some other suitable information, as described in detail in relation to FIG. 4. In certain embodiments, routing table 306 may be implemented in a hardware module, such as an ASIC or network processor.

The depicted control port 308 is a network port dedicated to connecting software-configured switch 300 with logically centralized controller 106, and may include a 100BASE-TX port, a 1000BASE-T port, a 10 GBASE-T port, or other suitable network port. In certain embodiments, control port 308 may be a logical port dedicated to communications with logically centralized controller 106, such as a socket end point of a transmission control protocol (TCP) connection, an SSL connection, a TLS connection, or some other connection suitable for transmitting control communications. Logically centralized controller 106 transmits routing instructions to software-configured switch 300 via control port 308. A packet related to a traffic flow may also be transmitted to or received from firewall 206 through control port 308. In certain embodiments, control port 308 may provide secure communications, such as by using the SSL protocol, the TLS protocol, or other suitable protocol. In certain embodiments, there may be more than one control port 308.

Software-configured switch 300 transmits network traffic between connected network elements 303. Rules for routing network traffic are provided by logically centralized controller 106 via control port 308, and are stored in routing table 306. The rules include forwarding a packet not associated with a specific rule to firewall 206 and forwarding a packet received from firewall 206 through control port 308 to a server 102.

Figure 4:
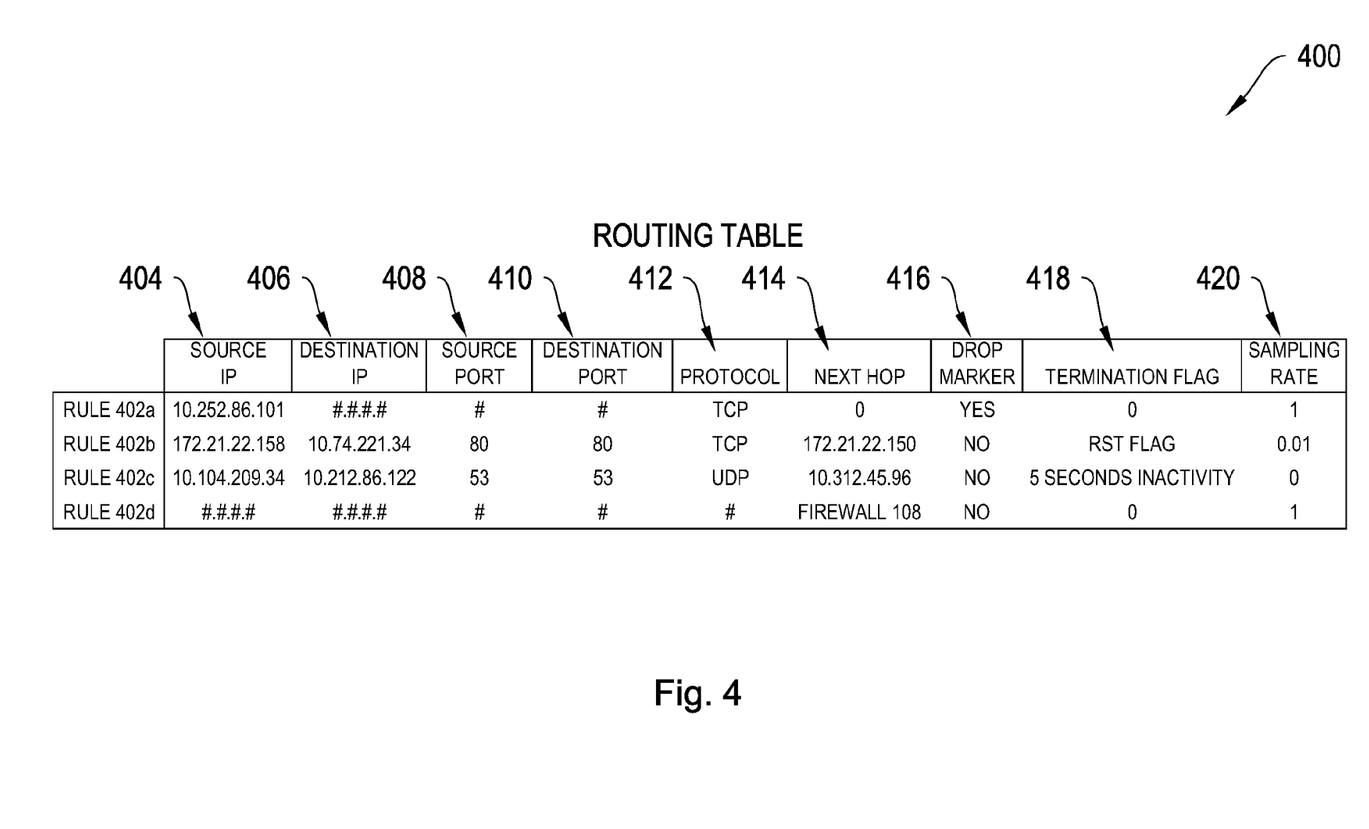
FIG. 4 is a table depicting a routing table of rules software-configured switch follows in forwarding network traffic.

FIG. 4 is an illustrative table of a routing table 400 such as the routing table 306 depicted in FIG. 3. Routing table 400 is a computer-readable and -writable medium capable of storing information identifying how to identify and treat a packet associated with a traffic flow. Rules 402a-d, collectively rules 402, are rules for identifying and handling a packet associated with a traffic flow. In certain embodiments, there may be a different number of rules 402 than are depicted. Referring to FIG. 1, source IP 404 identifies the IP address of the server 102 which generated the packet, destination IP 406 identifies the IP address of the destination server 102 of the packet, source port 408 identifies the port of the server 102 which transmitted the packet, destination port 410 identifies the destination port of the packet, and protocol 412 identifies the transfer protocol of the packet. Source IP 404, destination IP 406, source port 408, destination port 410, and protocol 412 may identify which rule 402 a traffic flow is subject to. In certain embodiments, a traffic flow may also be identified as subject to a rule 402 through other characteristics of a packet associated with the traffic flow, which may include the presence of regular expressions in the body of the packet, the length of a part or parts of the packet, the length of time the packet may exist on the network before being discarded (known as the time-to-live value of the packet), or other identifying characteristics. Next hop 414 identifies where the packet will be sent on a route to the destination 406 of the packet, drop marker 416 identifies whether the packet should be dropped by the software-configured switch 300, session termination flag 418 provides an identifier determining whether the traffic flow associated with rule 402 has been completed, and sampling rate 420 identifies how many packets matching rule 402 should be transmitted to firewall 108. Next hop 414, drop marker 416, session termination flag 418, and sampling rate 420 thereby provide the routing rule implementing the precautionary traffic flow.

A packet will be routed by a software-configured switch 300 according to the rules 402 recorded in routing table 400. As an illustrative example, a packet from the source 404 corresponding to rule 402a will be dropped by the software-configured switch 300, while a packet not matching rules 402a, 402b, or 402c will be directed to firewall 108 as indicated in rule 402d. Likewise, one out of every hundred TCP packets generated by the source 404 corresponding to rule 402b and addressed to the destination 406 corresponding to rule 402b will be transmitted to firewall 108, while other such TCP packets will be transmitted to the next hop 414 destination corresponding to rule 402b. In certain embodiments, routing table 400 may record other identifying information, such as a regular expression in the body of a packet or other suitable identifying information.

Figure 5:
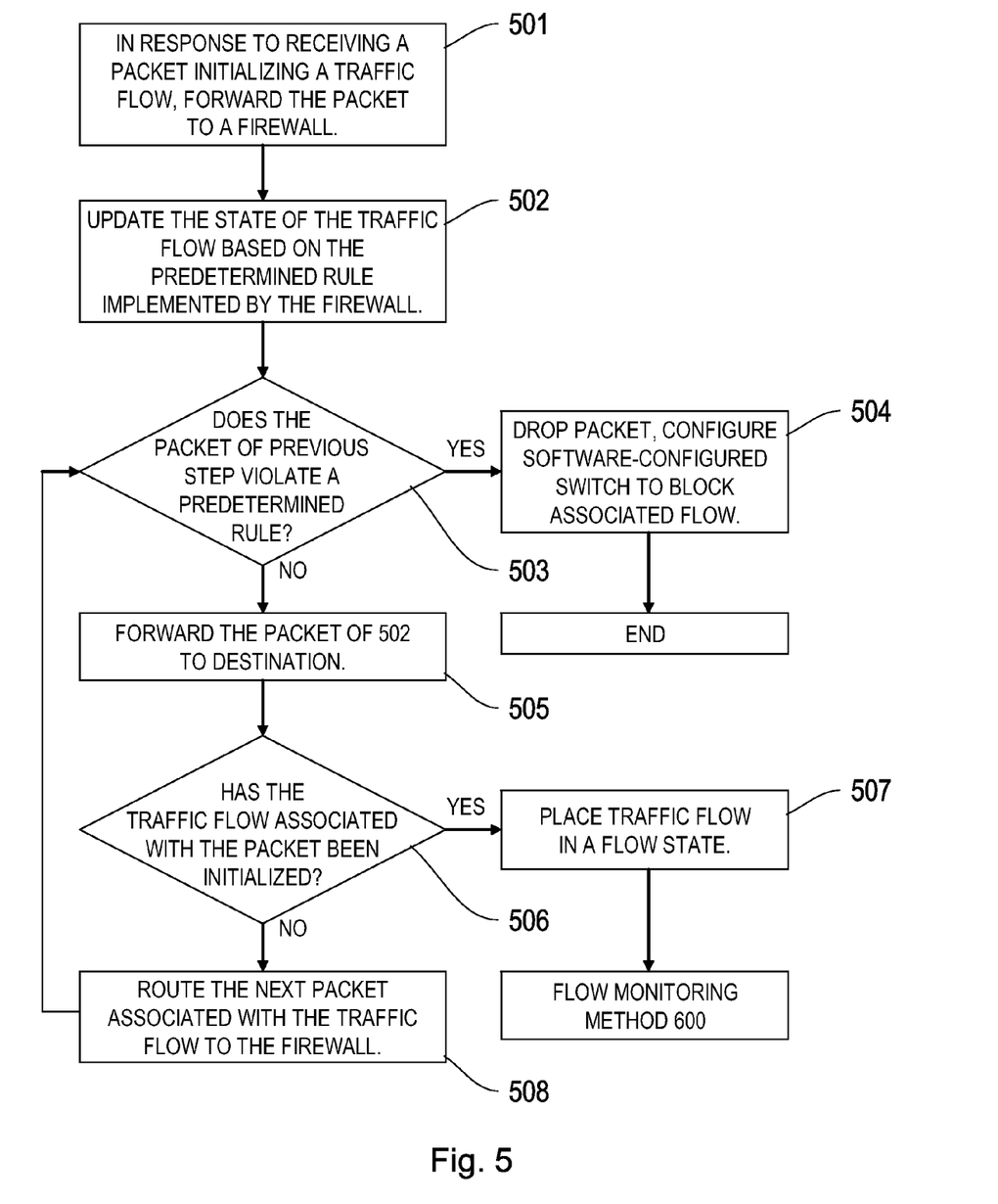
FIG. 5 is a flow chart of a method of making an initial firewall review of a traffic flow.

FIG. 5 is an illustrative flow chart of an initialization method 500, a method for making an initial determination of the state of a traffic flow. Referring to FIG. 1, initialization method 500 begins when a server 102 transmits a packet initializing a traffic flow. Referring to FIG. 2, in step 501, software-configured switch 104 follows a precautionary traffic routing plan in forwarding the initializing packet to logically centralized controller 200, allowing firewall 206 to examine the packet.

In step 502, firewall 206 may generate or update a state of a traffic flow associated with the packet forwarded in the immediately preceding step. Association between a packet and a traffic flow may be determined by examining one or more headers of the packet, which may include a source IP address, a destination IP address, a source port, a destination port, or a transfer protocol. The state of a traffic flow is stored in traffic state database 208, and may indicate whether the traffic flow has violated a predetermined rule, whether the traffic flow is initializing, and whether the traffic flow should be monitored further. The predetermined rule may include an authorized source or destination IP address, an authorized transfer protocol, a regular expression within the packet body associated with an unauthorized transfer protocol, or some other suitable rule for determining whether the traffic flow is in a breach state that will be blocked or a flow state that may proceed. Initialization method 500 then proceeds to implement the updated state.

Step 503 determines whether the traffic flow is in a breach state. If firewall 206 updated the state of the traffic flow to reflect a violation, initialization method 500 proceeds to step 504. In step 504, firewall 206 discards the packet of step 502, solver 212 updates the precautionary traffic routing plan to block the traffic flow in the breach state, and switch manager 204 implements the updated precautionary traffic routing plan in a software-configured switch 104. The precautionary traffic routing plan thereby prevents the traffic flow from engaging in unauthorized activity while leaving firewall 206 free to examine other traffic flows. In certain embodiments, further actions may be taken in step 504, which may include alerting a network administrator, more closely monitoring other traffic flows associated with the source of the violation, or other suitable responses to a violation.

If, however, firewall 206 did not detect a violation, the traffic flow may continue. In step 505, firewall 206 forwards the packet of step 502 to a destination server 102, and step 506 determines whether the associated traffic flow has been initialized. If a traffic flow has been initialized, firewall 206 places the traffic flow in a flow state in step 507 and flow monitoring method 600, described in detail in relation to FIG. 6, begins. Otherwise, switch manager 204 routes the next packet of the traffic flow to firewall 206 in step 508, and initialization method 500 returns to step 502 to continue monitoring the traffic flow for violations of a predetermined rule. In certain embodiments, firewall 206 may monitor a bidirectional traffic flow by updating the state of the traffic flow based on one or more packets transmitted from the source server 102 to the destination server 102 and one or more packets transmitted from the destination server 102 to the source server 102. As an illustrative example of such embodiments, a traffic flow using TCP initializes with three packets: a synchronization (SYN) packet sent from a source server 102 to a destination server 102, a synchronization-acknowledgment (SYN-ACK) packet sent from the destination server 102 to the source server 102 in response to the SYN packet, and an acknowledgment (ACK) packet sent from the source server 102 to the destination server 102 in response to the SYN-ACK packet. In this example, firewall 206 may update the state of the TCP traffic flow based on the SYN, SYN-ACK, and the ACK packets.

Figure 6:
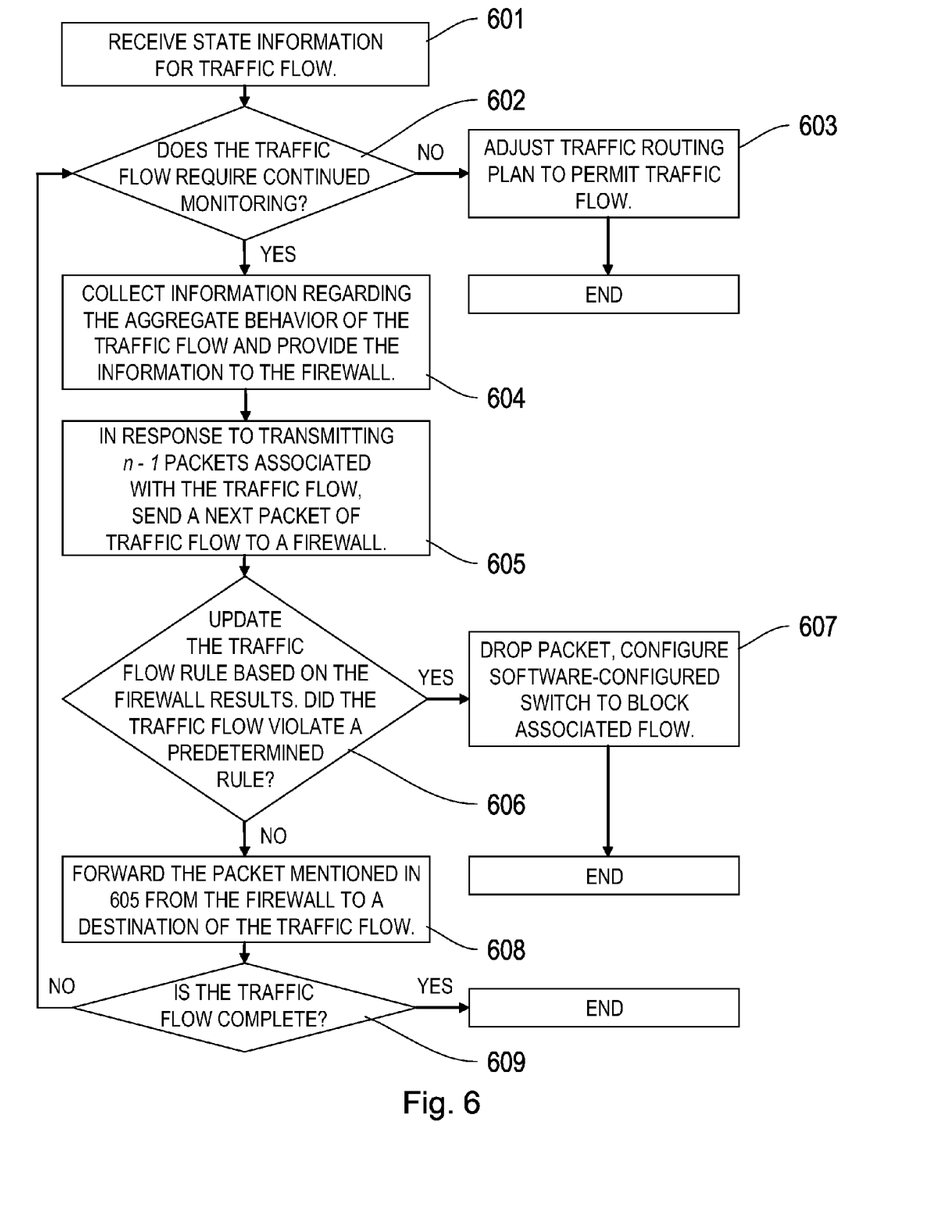
FIG. 6 is a flow chart of a method of monitoring a traffic flow.

FIG. 6 is an illustrative flow chart of a flow monitoring method 600 for transmitting data in a network with a stateful firewall. Referring to FIG. 2, flow monitoring method 600 begins with step 601, in which traffic flow database 208 receives state information for a traffic flow from firewall 206. In step 602, solver 212 determines whether firewall 206 indicated that the traffic flow required further monitoring. If firewall 206 placed the traffic flow in an unreserved flow state, flow monitoring method 600 may proceed to step 603, in which solver 212 updates the precautionary traffic routing plan through switch manager 204. In the updated precautionary traffic routing plan, all packets associated with the traffic flow bypass logically centralized controller in being transmitted from a source server 102 to a destination server 102. In certain embodiments, step 602 and 603 may also identify a change or an expected change in network topology, and update the precautionary traffic routing plan to reflect the change in network topology. After step 603, the traffic flow continues until complete. In certain embodiments, the traffic flow may end when an end-of-session packet associated with the traffic flow is generated, when the traffic flow is inactive for a predetermined period, or when some other indicator of the end of the traffic flow is identified. In such embodiments, a software-configured switch 104 may be provided with an updated precautionary traffic routing plan, in which the completed traffic flow is removed.

If firewall 206 indicated that the traffic flow should be further monitored, flow monitoring method 600 continues to step 604. In step 604, switch manager 204 may provide firewall 206 with information regarding an aggregate behavior of packets in the traffic flow, such as a packet exchange rate, an average packet size, or other information regarding the aggregate behavior of packets in the traffic flow. Referring to FIG. 1, in step 605, solver 212 may update the precautionary traffic routing plan to route one out of every n packets associated with the traffic flow through firewall 206, where n is an integer. Solver 212 thus allows firewall 206 to more closely inspect a traffic flow for unauthorized activity. In this precautionary traffic routing plan, other packets associated with the traffic flow would be routed directly to a destination server 102, bypassing logically centralized controller 200 and thus reducing the bottleneck created by logically centralized controller 200. In certain embodiments, some other fraction of packets associated with the traffic flow may be routed to firewall 206, such as two out of three packets. In certain embodiments, solver 212 may route no packets associated with the traffic flow to firewall 206.

In step 606, firewall 206 updates traffic flow database 208 based on the information provided in steps 604 and 605. If firewall 206 discovered a violation of the predetermined rule in the traffic flow, flow monitoring method 600 continues to step 607, in which firewall 206 drops any packets provided in step 605, and switch manager 204 provides software-configured switch 104 with an updated precautionary traffic routing plan blocking the traffic flow. If not, flow monitoring method 600 continues to step 608, in which firewall 206 forwards any packets provided in step 605 to the destination server 102. Step 609 then determines if the traffic flow has ended. If a packet of step 605 ended the traffic flow, flow monitoring method 600 comes to an end; otherwise, flow monitoring method 600 returns to step 602. In certain embodiments, the traffic flow may be ended by an end-of-session packet, a predetermined period of inactivity, or some other indicator of a completed traffic flow, and such precautionary traffic routing plan may be updated to remove the completed traffic flow in response to an identification of such an indicator.

Figure 7:
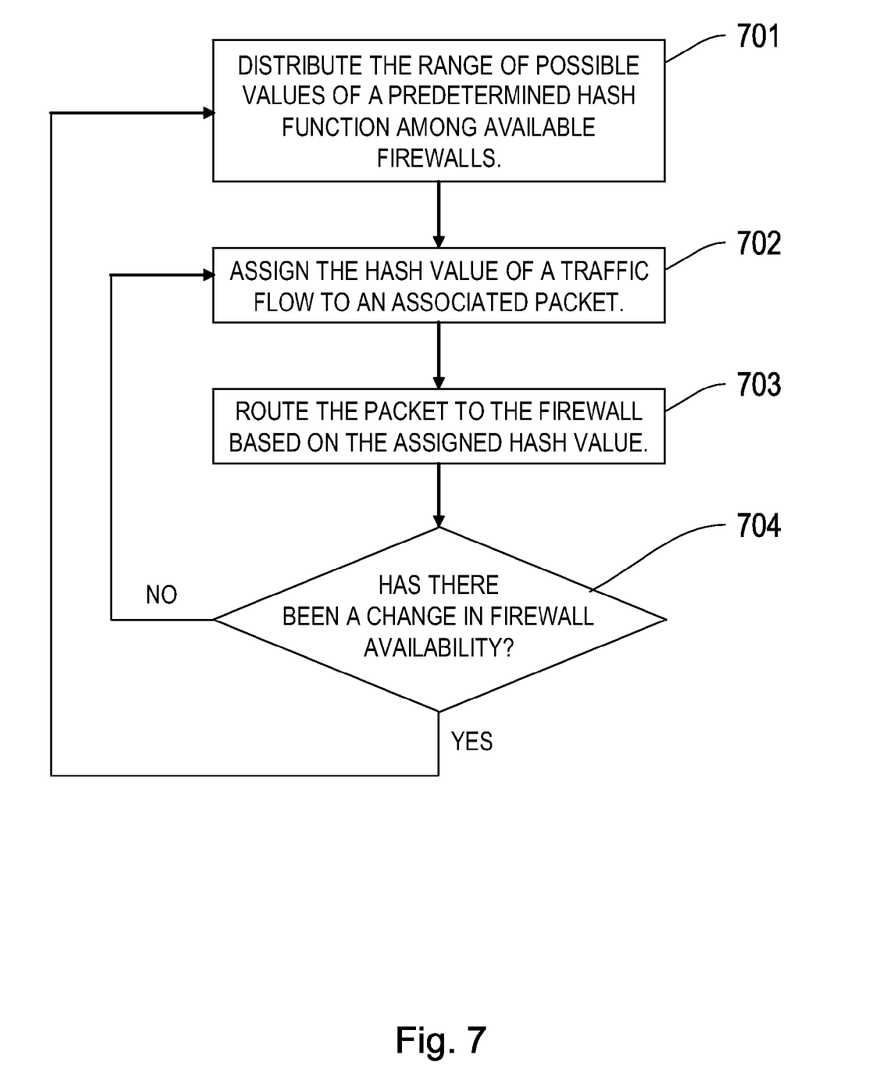
FIG. 7 is a flow chart of a method of assigning a traffic flow to one firewall among a plurality of firewalls.

FIG. 7 is an illustrative flow chart of a firewall assignment method 700 for distributing traffic flow monitoring responsibilities among a plurality of firewalls. Referring to FIG. 2, firewall assignment method 700 begins when logically centralized controller 200 detects a change in the availability of one or more firewalls 206. In step 701, switch manager 204 distributes the range of possible values of a predetermined hash function among available firewalls 206. The hash function assigns a single value, known as a hash value, to a traffic flow based on information identifying the traffic flow. In certain embodiments, the information identifying the traffic flow may be a five-tuple, a set of five values representing a source IP address, a destination IP address, a source port, a destination port, and a transfer protocol of a packet or a traffic flow. Thus, assigning each available firewall 206 a part of the range of possible hash values assigns a set of traffic flows to a particular firewall 206. In certain embodiments, switch manager 204 may assign the portion of the range based on the capacity of each firewall 206, thereby balancing the workload of the firewalls 206 to reduce the bottleneck created by any single firewall 206. In certain embodiments, both directions of a bidirectional traffic flow are assigned to a single firewall 206 by defining the predetermined hash function such that two traffic flows use the same transfer protocol and take place between the same ports on the same servers 102 are assigned the same hash value.

In step 702, switch manager 204 assigns the hash value of a traffic flow to a packet or other information associated with the traffic flow. In certain embodiments, the hash value is assigned to a packet by calculating the value of the hash function of the five-tuple of the packet. In step 703, switch manager 204 routes the packet or other information based on the assigned hash value, thereby routing packets associated with a first traffic flow to a first firewall 206 and packets associated with a second traffic flow to a second firewall 206.

In step 704, switch manager 204 determines if there has been a change in availability of a firewall 206. If not, assignment method 700 returns to step 702 and continues to route information regarding a traffic flow to the firewall 206 associated with the traffic flow. If there has been a change in availability, assignment method 700 returns to step 701 to reassign traffic flows to firewalls 206. In certain embodiments, assignment method 700 does not reassign hash values associated with both an available firewall 206 and an existing traffic flow.

Figure 8:
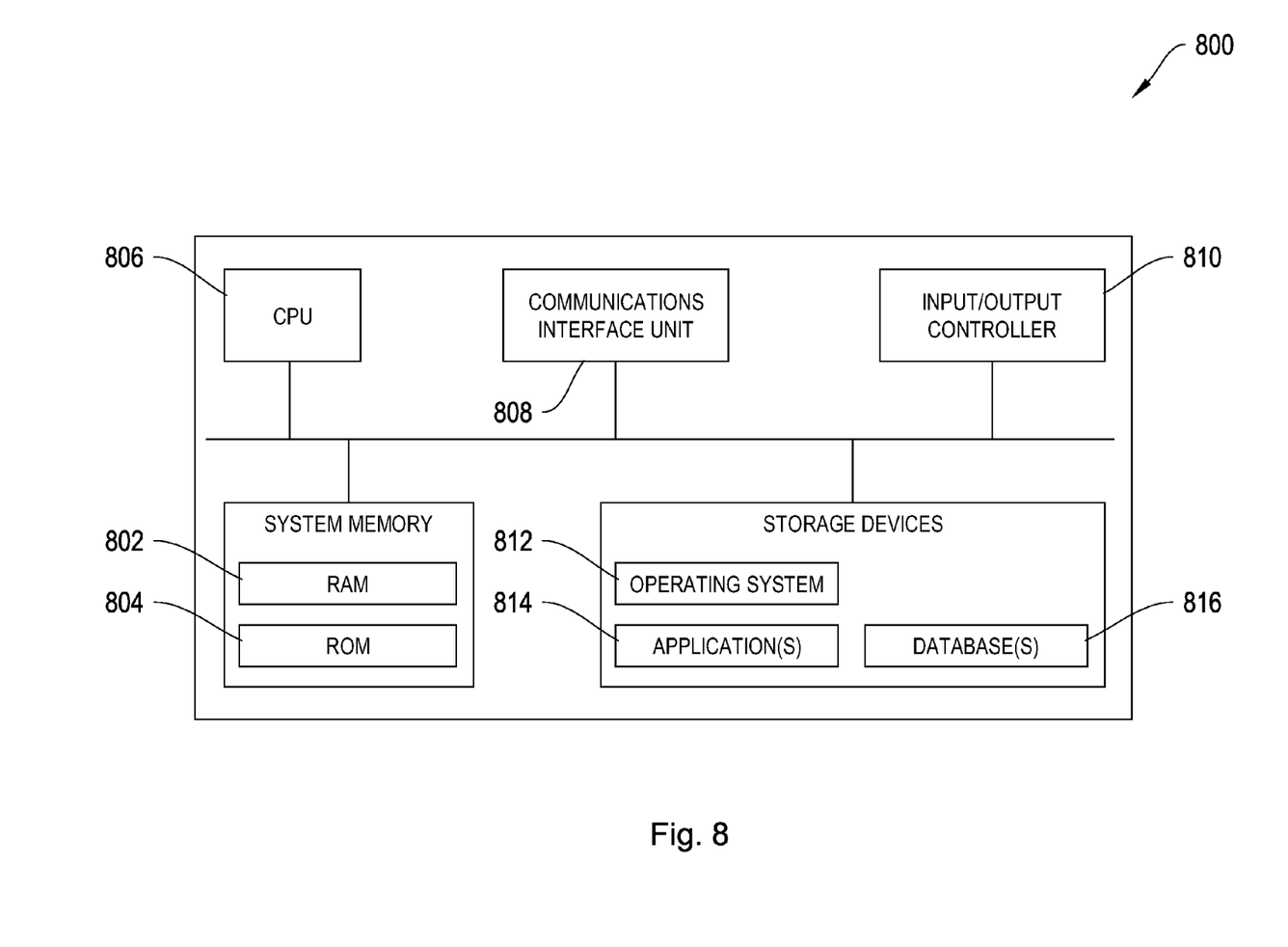
FIG. 8 is a block diagram of a computing device for performing any of the processes described herein.

FIG. 8 is an illustrative block diagram of a computing device that can be used to implement or support the any of the components of the system of FIG. 1, and for performing any of the processes described herein. Each of the components of system 100 may be implemented on one or more computing devices 800. In certain aspects, a plurality of the components of system 100 may be included within one computing device 800. In certain implementations, a component and a storage device may be implemented across several computing devices 800.

The computing device 800 comprises at least one communications interface unit, an input/output controller 810, system memory, and one or more data storage devices. This can support a communications port such as traffic port 302a of FIG. 3. The system memory includes at least one random access memory (RAM 802) and at least one read-only memory (ROM 804). The memory 804 can support the traffic flow database 208 of FIG. 2, for example. All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network or local network, to other servers or systems.

The computing device 800 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device. The data storage device may comprise an appropriate combination of magnetic, optical or semiconductor memory, and may include, for example, RAM 802, ROM 804, flash drive, an optical disc such as a compact disc or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device via the communications interface unit 808. The CPU 806 may be configured to perform one or more particular processing functions.

The data storage device may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program. The depicted database 816 can be any suitable database system, including the commercially available Microsoft Access database, and can be a local or distributed database system. The design and development of suitable database systems are described in McGovern et al., A Guide To Sybase and SQL Server, Addison-Wesley (1993).

The operating system 812 and applications 814 may be stored, for example, in a compressed, an uncompiled and an encrypted format, and may include computer program code. The instructions of the program may be read into a main memory of the processor from a computer-readable medium other than the data storage device, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to providing a stateful firewall to a network as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the disclosure have been shown and described herein, it will be obvious to those skilled in the art that such embodiments are provided by way of example only. Numerous variations, changes, and substitutions will now occur to those skilled in the art without departing from the disclosure. For example, the system may include a cluster of firewalls, the precautionary traffic routing plan may provide only an initialization packet to a firewall, a software-configured switch may be configured to identify and block packets violating a predetermined rule, or the logically centralized controller may be configured to recognize other firewalls on the network and adapt them to the system. It should be understood that various alternatives to the embodiments of the disclosure described herein may be employed in practicing the disclosure. It is intended that the following claims define the scope of the disclosure and that methods and structures within the scope of these claims and their equivalents be covered thereby.

I claim:

1. A computer-implemented method for providing stateful firewall service to a network having a software-configured switch, comprising:
   identifying a traffic flow of data from a source server or end-host to a destination server or end-host;
   providing the software-configured switch with a precautionary traffic routing plan in which the traffic flow is routed through a firewall implementing a predetermined rule;
   in response to finding the traffic flow in compliance with the predetermined rule, marking the traffic flow as being in a flow state and identifying a plurality of packets associated with the traffic flow;

in response to detecting a violation of the predetermined rule, marking the traffic flow as being in a breach state; and providing the software-configured switch with an update to the precautionary traffic routing plan in which a traffic flow in the breach state is blocked, the plurality associated with a traffic flow in the flow state bypasses the firewall, and all other packets are routed through the firewall.

2. The method of claim 1, wherein the firewall is capable of searching a header and a body of a packet for a violation of the predetermined rule.

3. The method of claim 2, further comprising implementing the predetermined rule by searching the body of a packet for a regular expression associated with a banned transfer protocol.

4. The method of claim 1, further comprising providing a logically centralized controller and examining a packet header of a packet initializing the traffic flow with the logically centralized controller to identify the traffic flow.

5. The method of claim 4, wherein the logically centralized controller is an OpenFlow Controller.

6. The method of claim 4, further comprising providing an aggregate behavior of packets in the traffic flow identified by the logically centralized controller to the firewall.

7. The method of claim 6, wherein the aggregate behavior includes whether a packet exchange rate exceeds a maximum threshold included in the predetermined rule.

8. The method of claim 6, wherein the aggregate behavior includes whether an average packet size exceeds a maximum threshold included in the predetermined rule.

9. The method of claim 1, wherein the traffic flow is found in compliance with the predetermined rule based on a packet initializing the traffic flow.

10. The method of claim 1, wherein the traffic flow is found in compliance with the predetermined rule based on a packet generated in response to a packet initializing the traffic flow.

11. The method of claim 1, wherein the plurality of packets associated with the traffic flow includes a predetermined fraction of packets associated with the traffic flow.

12. The method of claim 1, further comprising implementing the predetermined rule by determining whether a header of a packet matches an authorized transfer protocol.

13. The method of claim 1, further comprising implementing the predetermined rule by determining whether a header of a packet matches an authorized IP address.

14. The method of claim 1, further comprising providing the software-configured switch with an update to the precautionary traffic routing plan removing a traffic flow in response to identifying an indicator of an end of the traffic flow.

15. The method of claim 14, wherein the indicator is an end-of-session packet for the traffic flow.

16. The method of claim 14, wherein the indicator is a predetermined period of inactivity.

17. The method of claim 1, further comprising identifying a change of network topology and providing the software-configured switch with a traffic routing plan based on the precautionary traffic routing plan and the change of network topology.

18. The method of claim 1, further comprising routing a first traffic flow through a first firewall implementing the predetermined rule and a second traffic flow through a second firewall implementing the predetermined rule.

19. A system to provide stateful firewall service to a network having a software-configured switch, comprising:
a switch manager for programming the software-configured switch with a traffic routing plan;
a firewall for placing a traffic flow is in a flow state or a breach state based on a predetermined rule; and
a solver for generating a precautionary traffic routing plan in which a traffic flow in the breach state is blocked, a first plurality of packets associated with a traffic flow in the flow state bypasses the firewall, and a second plurality of other packets is routed through the firewall.

20. The system of claim 19, wherein the firewall is further configured for searching a header and a body of a packet to assign a state based on the predetermined rule.

21. The method of claim 20, wherein the predetermined rule includes banning a regular expression associated with a transfer protocol.

22. The system of claim 19, wherein the switch manager is an OpenFlow controller.

23. The system of claim 19, wherein the solver is further configured for removing a traffic flow that has ended from the precautionary traffic routing plan.

24. The system of claim 23, wherein the switch manager is further configured for identifying an indicator of an end of the traffic flow.

25. The system of claim 24, wherein the indicator is an end-of-session packet for the traffic flow.

26. The system of claim 24, wherein the indicator is a predetermined period of inactivity.

27. The system of claim 19, wherein the switch manager includes means for providing a measure of an aggregate behavior of the packets in the traffic flow to the firewall.

28. The system of claim 27, wherein the predetermined rule includes a range of a packet exchange rate associated with the traffic flow.

29. The system of claim 27, wherein the predetermined rule includes a range of a size of a plurality of packets associated with the traffic flow.

30. The system of claim 19, wherein the second plurality of packets includes a packet initializing the traffic flow.

31. The system of claim 19, wherein the second plurality of packets includes a packet generated in response to a packet initializing the traffic flow.

32. The system of claim 19, wherein the second plurality of packets includes a predetermined fraction of packets associated with the traffic flow.

33. The system of claim 19, wherein the predetermined rule includes an authorized transfer protocol.

34. The system of claim 19, wherein the predetermined rule includes an authorized IP address.

35. The system of claim 19, further comprising a second firewall for placing a traffic flow in a flow state or a breach state based on a predetermined rule.

36. The system of claim 35, wherein the switch manager is further configured to assign a first traffic flow to the firewall and a second traffic flow to the second firewall.

37. The system of claim 19, wherein the switch manager is further configured for identifying a change of network topology.

38. The system of claim 37, wherein the solver is further configured for updating the precautionary traffic routing plan based on the change of network topology.

* * * * *